United States Patent Office 2,923,073
Patented Feb. 2, 1960

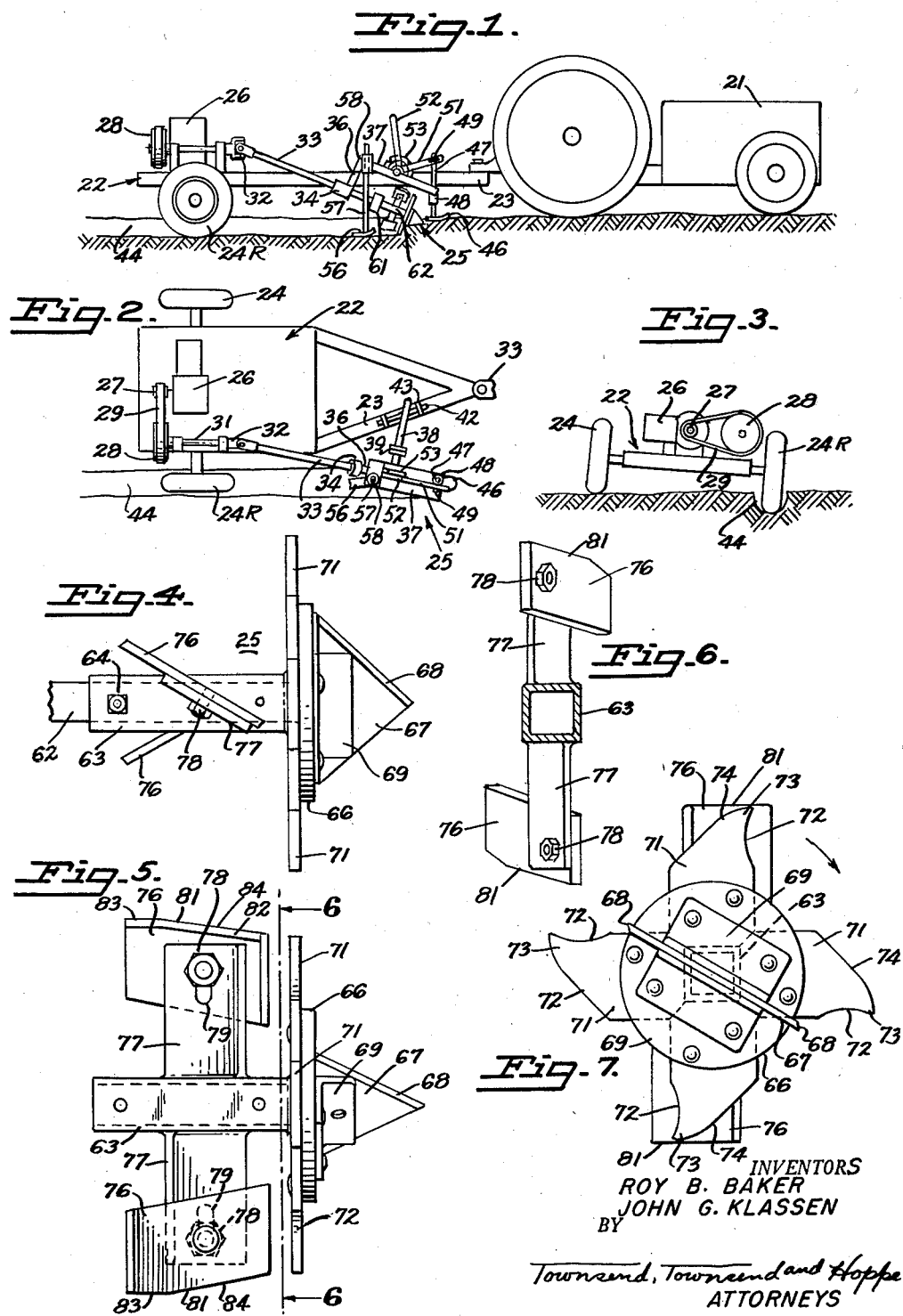
Feb. 2, 1960 — R. B. BAKER ET AL — 2,923,073
DITCH DIGGER
Filed June 29, 1953 — 2 Sheets-Sheet 1
INVENTORS
ROY B. BAKER
JOHN G. KLASSEN
BY Townsend, Townsend and Hoppe
ATTORNEYS

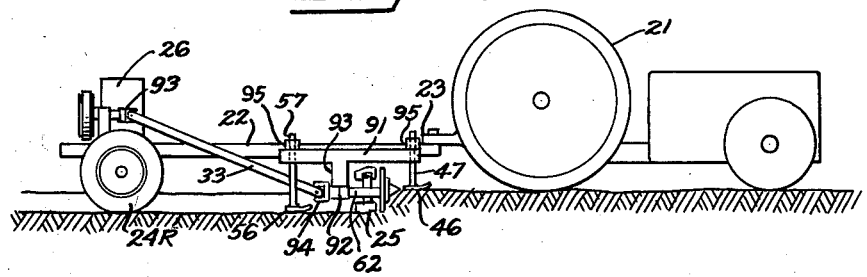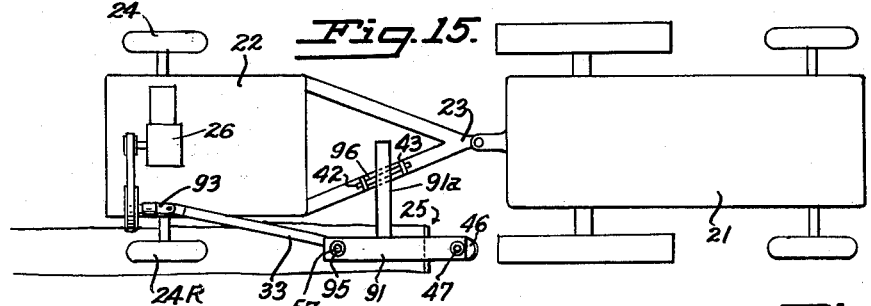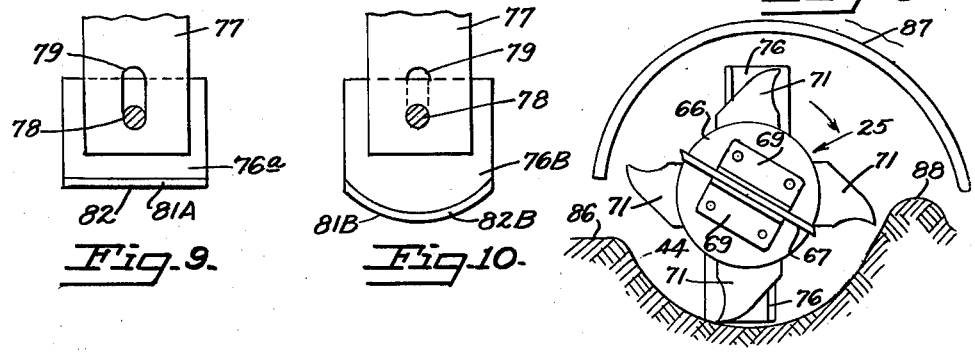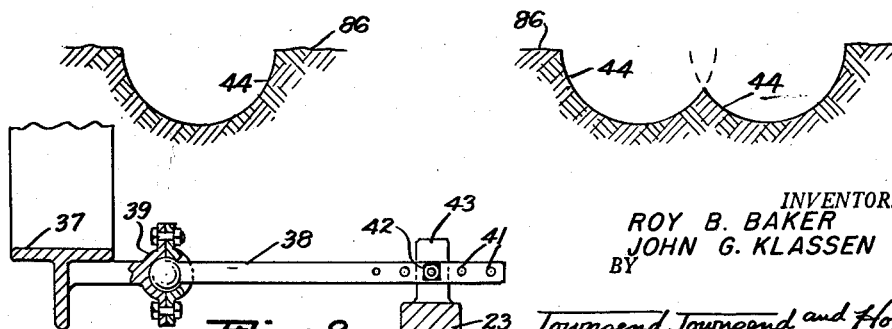

2,923,073

DITCH DIGGER

Roy B. Baker, Medford, and John G. Klassen, Phoenix, Oreg.

Application June 29, 1953, Serial No. 364,762

5 Claims. (Cl. 37—92)

This invention relates to new and useful improvements in ditch-digging implement.

The present invention is an agricultural implement which may be employed in connection with appropriate motor power to dig a ditch such as a lateral irrigation ditch. The implement is power-driven and preferably tractor-drawn and comprises a ditch-digging tool on a forwardly and downwardly projecting shaft, which tool is brought into contact with the ground as the tractor advances.

The implement, in addition to digging ditches, may also be employed to clean existing ditches or to improve the shape thereof.

One of the particular features of the instant invention is that fact that the tool is so constructed that it may be adjusted to scatter the dirt over a considerably wide range insead of piling the dirt alongside the ditch as is the result where a plow or similar implement is employed. The rotation of the tool and the design of the blades which make up its cutting and cleaning members is such that the dirt is first broken into small pieces and then propelled laterally with sufficient force so that it is scattered away from the side of the ditch.

The implement may be used to scatter the earth piled up alongside the edge of an existing ditch. It is also useful in cleaning fence rows and cleaning mounds in orchards. When employed along hill-sides it may be modified to build up dirt along the downward slope of the ditch. The device may also be used to plow a furrow with mulch. The implement may also be used to hoe or clean out grass under trees. Other uses for the device will be apparent from the description of the invention which is hereinafter set forth.

One of the advantages of the invention is the fact that the tool is of such construction that its component parts may be subjected to considerable adjustment depending on the desired type of ditch being dug. Thus, for example, the tool may be made to revolve in either direction, that is, either clockwise or counter-clockwise and this determines the direction in which the dirt will be scattered. The tool comprises three blades, the first blade being an auger-type, flat, pointed blade which clears a hole through which the tool may advance. The second blade of the tool is a cutter blade which comprises radially extending sharp members which chop the earth into small pieces. Behind the cutter blades are the radially extending cleaner blades which extend longitudinally of the tool. The cleaner blades throw the dirt transversely to the direction of movement of the implement. If it is desired to pile up the dirt alongside the ditch instead of spreading it broadcast, an arcuate shield may be placed over the top of the cleaner blades to prevent the dirt from being scattered and to direct it alongside the ditch.

Other objects of the present invention will become apparent upon reading the following specification and referring to the accompanying drawings in which similar characters of reference represent corresponding parts in each of the several views.

In the drawings:

Fig. 1 is a schematic side elevation of the tractor and trailer on which the implement is mounted.

Fig. 2 is a top plan of the trailer with parts omitted for purpose of clarity.

Fig. 3 is a rear elevation thereof.

Fig. 4 is a side elevation of the tool at the forward end of the implement.

Fig. 5 is a plan of the tool.

Fig. 6 is a section taken along the line 6—6 of Fig. 5.

Fig. 7 is a front elevation of the tool.

Fig. 8 is an elevation partly broken away in section showing the support means for the tool.

Fig. 9 is a fragmentary view of a modified form of cleaner blade.

Fig. 10 is a fragmentary view of another modified form of cleaner blade.

Fig. 11 is a schematic vertical section of a ditch showing one advantageous feature of the invention, namely that no dirt is piled alongside the ditch.

Fig. 12 shows two parallel overlapping ditches and illustrating the fact that no dirt is thrown up alongside the ditch is of advantage when a wider ditch is required.

Fig. 13 is a transverse section showing a shield mounted over the tool, such tool being used to direct the dirt to the side of the ditch.

Fig. 14 is a side elevation of the modified hitch for the tool.

Fig. 15 is the top plan of the structure shown in Fig. 14 with parts omitted for purpose of clarity.

The implement which is the subject of this invention is drawn by a conventional tractor 21 connected to a trailer 22 by means of a conventional draw bar 23. The trailer has two wheels 24 and carries a motor 26 which is used to drive the tool 25. It will be understood that although, as illustrated herein, a separate tractor 21 and trailer 22 are employed, it is within the scope of this invention that the implement be mounted directly on the tractor and that the tractor motor may be used with a suitable take-off to drive the implement.

The ditch-digging tool 25 is so mounted on trailer 22 that it projects forwardly and downwardly ahead of right wheel 24R and preferably the ditch is formed approximately in line with the right wheel 24R so that said wheel rides in the ditch. This arrangement tends to stabilize the implement and insure that a ditch of uniform depth is obtained. The trailer and/or tractor may travel on either side of the ditch or over the ditch. The motor 26 mounted on the trailer is provided with a pulley 27 which drives a second pulley 28 in a speed-reducing ratio by means of belt 29. Driven pulley 28 is connected to a horizontal forwardly extending shaft 31, the front end of which is provided with a universal joint connection 32 to a downwardly and forwardly extending shaft 33 which is received in bearing 34 carried by arm 36 depending from bar 37 disposed parallel to shaft 33. Bar 37 is suitably supported, preferably from draw bar 23, by means of a transversely extending member 38 connected to bar 37 by a ball and socket joint 39 attached to bar 37. The inner end of member 38 is apertured in a series of spaced holes 41 which holes receive bolt 42 which also passes through an aperture in bracket 43 affixed to draw bar 23. Thus by positioning bolt 42 through the appropriate hole in the inner end of member 38, the lateral position of bar 37 and accordingly the lateral position of the tool 25 may be adjusted. It will be understood, however, that it is desirable that the tool be approximately in line with the right wheel 24R of trailer 22 so that said right wheel rides in the ditch 44 being formed. It is further apparent that various means may be employed to guide shaft 33.

The depth of the ditch 44 is controlled by the adjustment of the vertical position of bar 37 which in turn adjusts the permissible distance which tool 25 may extend below the ground level. For such purpose a shoe 46 is mounted on a vertical leg 47 slidably received in sleeve 48 on the forward end of bar 37. The shafts 47 and 57 which have on their depending ends the shoes 46 and 56 respectively are slidably mounted in sleeves 48 and 58 by suitable means which will securely lock the arms 47 and 57 in position with respect to the sleeves. Such means may comprise a screw rotatably engageable with the sleeve to frictionally engage the arm or may comprise a mutually matching pair of holes within the sleeve and arm with a mating pin or any other means conventionally used in the art for locking two sleeve members together. Said shoe 46 is vertically adjustable, as, for example, by a hydraulic cylinder, or, as illustrated herein, the upper end of leg 47 is connected by means of a slot and pin connection 49 to arm 51 on bell crank 51—52 which is pivotally mounted on bar 37, the angle of said arm 51 with respect to the horizontal being controlled by lever 52 which is adjusted by means of an arcuate notched adjustment bar 53 mounted on bar 37. Thus, by fitting a detent on lever 52 on an appropriate notch in arcuate member 53, the elevation of shoe 46 may be adjusted. This, in turn determines the depth of the ditch 44 being dug. For the purpose of stability, a rear shoe 56 may also be provided, said shoe having an upward extending vertical leg 57 adjustably slidably received in a second guide sleeve 58 on bar 37. Rear shoe 56 rides on the bottom of ditch 44 behind the cutting tool. By adjustment of lever 52 and by selection of the proper hole 41 in member 38, the depth and lateral displacement of the ditch may be adjusted.

The forward end of shaft 33 is provided with a rigid coupling 61, the forward end of the rigid coupling 61 having a spindle 62 received within hollow square or round column 63 which carries the tool. A shear pin 64 which passes through a hole in column 63 causes rotation of column 63 when spindle 62 revolves, it being understood that pin 64 will shear off if an undue strain on the tool 25 is imposed (as, for example, when a rock is encountered) thereby preventing damage to the mechanism.

The tool 25, which is mounted upon column 63, comprises three separate but cooperative blades. On the front of the tool and supported on disk 66 which is welded to column 63 is an auger type clearance blade 67. Said blade 67 is a flat pointed member extending parallel to the direction of the movement of the tool, the edges 68 of the plate being formed with rake. Thus as the tool 25 revolves the clearance blade 67 clears out a cylinder of earth having a diameter equal to the width of the blade 67. For purpose of rigidity two angular members 69 may be welded, bolted or riveted to disk 66, said angular members extending alongside blade 67.

Immediately behind clearance blade 67 and fixed to disk 66 by means of rivets, bolts or by welding are the four radially disposed cutter blades 71, the cutter blades projecting out from column 63 a considerably greater distance than the clearance blade, the amount of projection determining the size of the ditch. Cutter blades 71, which may be of any convenient number but as shown herein are four in number, cut the earth into particles as the tool advances. The leading edge 72 of each blade is concaved and the trailing edge 74 of each blade is formed with a considerable rake so that the extremities of the blades 71 form points 73.

Behind the cutter blades are two or more cleaner blades 76. The cleaner blades function to throw the earth which has been finely divided by the cutter blades 71. The cleaner blades 76, shown in the drawings as two in number, are mounted upon radially extending arms 77 affixed to column 63. The blades 76 themselves may be mounted on the arms 77 by means of nuts and bolts 78 which pass through a radially extending slot 79 in the outer edge of said arms. Blades 76 comprise flat plates disposed at an angle to the axis of rotation of column 63 and having elongated working edges 81 of considerable magnitude compared with the relatively thin cutter blades. The working edges 81 of blades 76 project from column 63 approximately the same distance as cutter blades 71. The working edges of blades 76 are beveled as indicated by numeral 82 to provide rake for rotation of the tool. The rearward portion 83 of working edge 81 of the blade is substantially parallel to the axis of rotation of the tool and the forward portion 84 slants inwardly so that the forward part 84 is substantially parallel to the ground when the blade 76 is in downwardmost position, thus cleaning the dirt along the bottom of the ditch in a stroke approximately parallel to the bottom of the ditch. The angle assumed by edge portion 84 may be adjusted for different depths of ditches upon loosening nut and bolt 78 and then re-tightening the same after the angle has been altered.

In the modification of Fig. 9 the cleaner blade 76A is shown formed with a straight rather than angular working edge 81A and the edge 81A is parallel to the axis of rotation of the tool. In the modification of Fig. 10 the edge 81B of the cleaner blade 76B is formed arcuate rather than straight. It will be understood that the shape of the cleaner blade 76 is subject to considerable additional modification, but that in all of the forms shown the cleaner blades function to throw the finely divided dirt at a considerable distance from the implement and scatter the dirt rather than piling it in windrows. This result is shown particularly in Fig. 11 wherein it will be seen that a ditch 44 which is semi-circular in cross-section is formed below ground level 86 but that no dirt is piled alongside the ditch as is the case with conventional ditch-diggers. Fig. 12 illustrates how the width of the ditch may be enlarged by forming two parallel overlapping cuts 44—44.

In Fig. 13 a modification is illustrated. In the preceding description it has been assumed that it is desirable to scatter the dirt broadcast rather than piling it up alongside the ditch. However, in some situations it is desirable that the dirt be piled up alongside the ditch. An example of such a situation is where the ditch is dug on a hillside and it is desired to pile the dirt dug out of the ditch on the down-hill side, thereby increasing the capacity of the ditch for holding water. In such installation an arcuate shield 87 is attached to bar 37 over the top of the tool, said shield functioning to guide the loose dirt around and over the top of the tool and into a windrow 88 alongside the ditch. By reversing the direction of rotation of the tool, the dirt may be directed in opposite directions so that the dirt may be deposited on either side of the ditch being dug.

A modification of the invention is illustrated in Figs. 14 and 15. In this modification an arm 91 is attached to the draw bar 23 by a horizontal arm 91a, said arm 91 having a depending leg 93 providing an enlarged bearing 92 which receives the spindle 62 of the tool. Arm 91 is provided at opposite ends with shoe supports or sleeves 95 to support shafts 47 and 57 which carry shoes 46 and 56 respectively. Thus, the column 63 of the tool 25 is held in line with the direction of movement of the rear wheel 24R substantially horizontal. The inner end of the outwardly extending arm 91a is pivotally mounted to draw bar 23 as at 96. Arm 91a is mounted at 96 so as to be rigidly held against movement in a horizontal direction but free for movement in a vertical direction. By this means the arm 91a holds arm 91 in relative parallel alignment with the forward direction of the tractor while allowing the device to be moved vertically in control of the shoes 46 and 56. In order to drive the tool 25 with the arrangement shown in Figs. 14 and 15 the shaft 33 is provided with universal joints 93 and 94 at its upper and lower end and inasmuch as the bearing 92 is of considerable length, the tool 25 retains a horizontal position yet is freely rotated by the downwardly and outwardly extending drive shaft 33. The shafts 47 and 57 which have on their depending ends the shoes 46 and 56 respectively are slidably mounted in sleeves 95 by suitable means which will substantially lock the arms 47 and 57 in position with respect to the sleeves. Such means may comprise a screw rotatably engageable with the sleeve to tightly frictionally engage the arm or may comprise a mutually latching pair of holes within the sleeve and arm with a mating pin or any other means conventionally used in the art for locking two telescoping members together.

It will be understood that instead of a single tool 25 gangs of tools may be mounted on trailer 22 so that parallel ditches may be formed simultaneously. The ditch digging implement may also be made as a self-propelled unit or may be driven through a power take-off on belts from the tractor.

Although the invention has been described in considerable detail by way of illustration and example, it is understood that various changes and modifications may be practiced within the spirit of the invention limited only by the scope of the claims appended hereto.

What is claimed is:

1. A ditch-digging implement comprising a vehicular body, wheels supporting said body, a motor mounted on said body, a horizontal shaft carried by said body and driven by said motor, a downwardly, forwardly and outwardly inclined shaft driven by said horizontal shaft, a tool on the forward end of said inclined shaft in line with one wheel of said body, a frame supporting the forward end of said inclined shaft, and means connecting said frame to said body, said last mentioned means being adjustable to adjust the height and outward displacement of said frame, and in which said tool comprises a column turned by said inclined shaft, a clearance blade on the forward end of said column, a plurality of thin, pointed, radially extending cutter blades behind said clearance blade, and a plurality of longitudinally elongated, radially supported cleaner blades behind said cutter blades arranged to scatter dirt particles over a wide area to the side of the ditch, all of said blades being mounted on and turned by said inclined shaft.

2. A tool for a ditch digging implement comprising a column, a transverse disc fastened to the forward end of said column, a flat, pointed clearance blade fastened to the front of said disc pointed in the direction of said column, a plurality of radially extending, thin, pointed cutter blades behind said clearance blade and extending outward a substantially greater distance than the width of said clearance blade, and a plurality of cleaner blades fastened to said column, said cleaner blades having their outer edges elongated and extending generally at an acute angle to said column.

3. A tool according to claim 2 which further comprises radially extending arms on the outer ends of which said cleaner blades are adjustably mounted for adjustment of the angle between the edge of said cleaner blade and the axis of rotation of said column.

4. A tool according to claim 2 which further comprises radially extending arms on the outer ends of which said cleaner blades are adjustably mounted for adjustment of the angle between the edge of said cleaner blade and the axis of rotation of said column and the outward displacement of said cleaner blade from said column.

5. A tool according to claim 4 in which said cleaner blade has an angular working edge directed inwardly at its forward portion and substantially parallel to said column at its rearward portion.

References Cited in the file of this patent

UNITED STATES PATENTS

| | | |
|---|---|---|
| 915,484 | Rountree | Mar. 16, 1909 |
| 992,866 | Francis | May 23, 1911 |
| 1,071,477 | Stowe | Aug. 26, 1913 |
| 1,095,097 | Fournet | Apr. 28, 1914 |
| 1,183,706 | Williams | May 16, 1916 |
| 1,201,644 | Schneider | Oct. 17, 1916 |
| 1,561,618 | Skinner | Nov. 17, 1925 |
| 1,789,753 | Hulslander | Jan. 20, 1931 |
| 2,438,637 | Jansen | Mar. 30, 1948 |
| 2,552,710 | Dodson | May 15, 1951 |
| 2,655,087 | Hester | Oct. 13, 1953 |
| 2,743,538 | Linzy | May 1, 1956 |

FOREIGN PATENTS

| | | |
|---|---|---|
| 368,380 | France | Oct. 4, 1906 |
| 703,380 | France | Feb. 3, 1931 |
| 276,654 | Germany | July 16, 1914 |